INVENTORS
EDWARD T. GETZ
MATTHEW PACAK

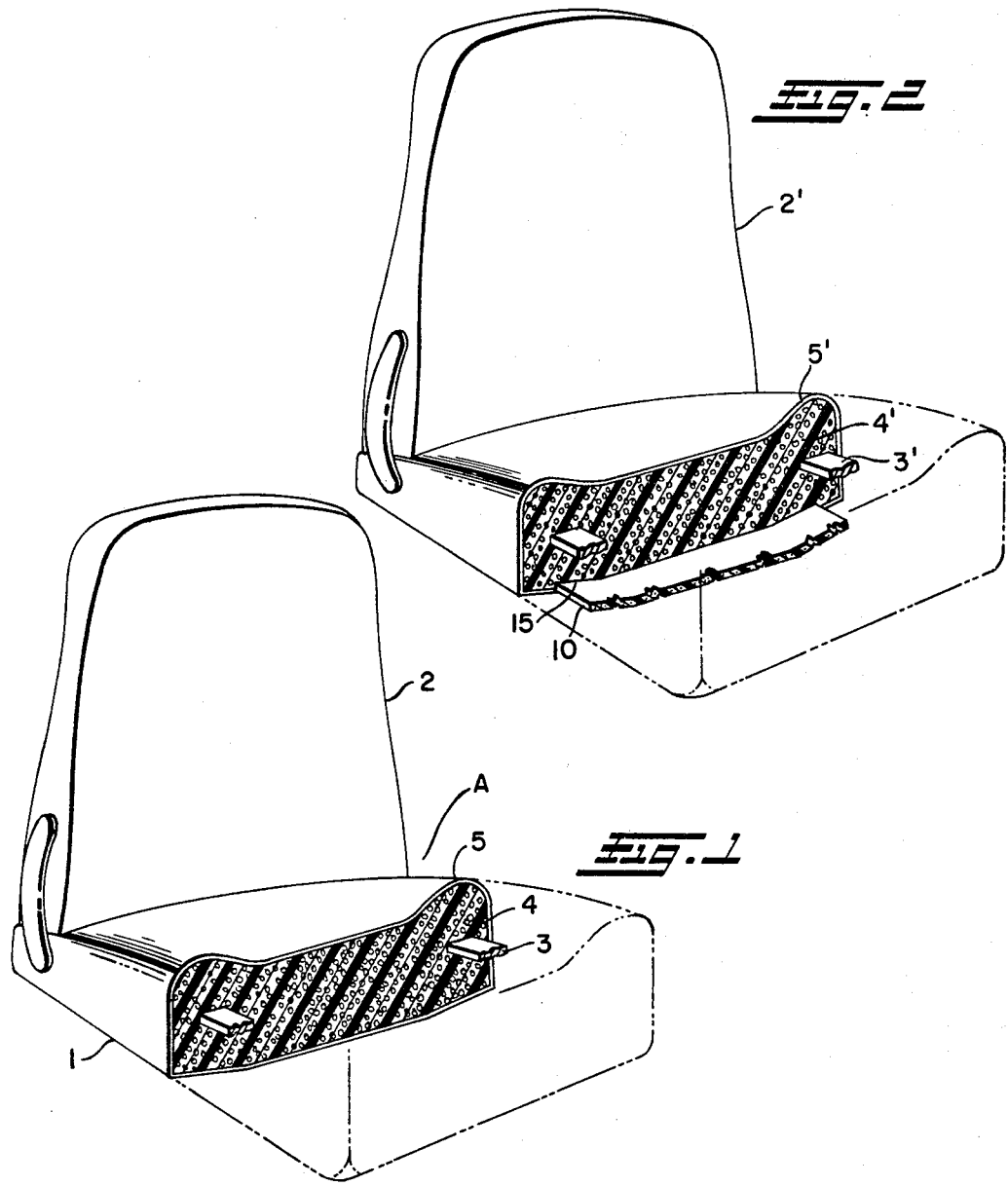
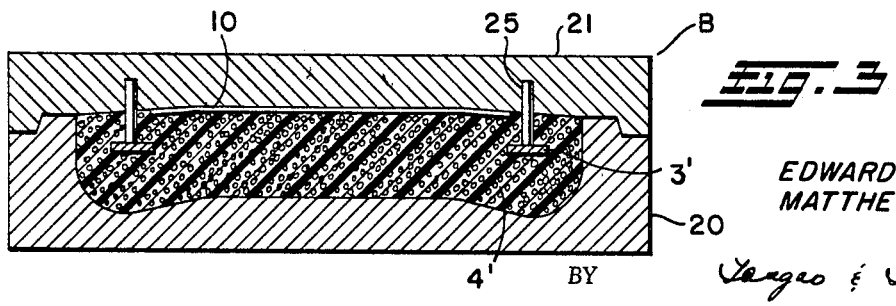

United States Patent Office 3,389,935
Patented June 25, 1968

3,389,935
COMPOSITE LOAD SUPPORTING STRUCTURE
Edward T. Getz, Cleveland Heights, and Matthew Pacak, Solon, Ohio, assignors to Eaton Yale & Towne Inc., Cleveland, Ohio, a corporation of Ohio
Filed May 11, 1966, Ser. No. 549,233
16 Claims. (Cl. 297—452)

This invention relates to load supporting structures adaptable for use as vehicle seats, furniture, crashpads, etc., or other cushion devices of this general nature. More specifically, this invention is directed to a composite load supporting structure including a frame and resilient material combined in a manner to provide a new and novel improved load supporting structure.

In the prior art, cushion or seat constructions used as load supporting structures of this general type did not take maximum advantage of the combination of the internal support structure and resilient material making up the cushion or seat. Such devices, for example, contain springs or other flexible members, the flexible members being attached to a frame which is adapted to be carried, for example, in the case of furniture, on the furniture legs, in the case of vehicle seats, on members protruding from the floor of the vehicle. Complicated internal reinforcement arrangements within the cushion constructions were provided for strength and life of the unit. Mounting means would normally have to be attached to the foam cushion unit. Also, the foamed cushion unit had to be covered with appropriate covering material which was usually provided with cover tie-down means such as lines which could be threaded through the unit and tied to specially provided means on the bottom of the unit. To so construct cushion units in these manners requires relatively complicated molding equipment, time consuming and costly manufacturing procedures, and consequently increased cost at a relatively slow production.

It is, accordingly, an object of the present invention to provide a load supporting structure of relatively simple construction including frame means and foamed elastomeric material having a molded contoured surface conforming to the desired shape of the load supporting structure.

It is another object of the present invention to provide a load supporting structure of relatively simple construction, but having extraordinary strength and endurance characteristics including frame means and foamed elastomeric material forming a resilient cushion about the frame means and having a preformed pad molded over a major portion of one face thereof.

Yet another object of this invention is provision of a load supporting structure as noted in the next preceding paragraph wherein the interface between the elastomeric material cushion and the pad is of denser, tougher consistency than either of said cushion or pad to provide a reinforced seat structure with a relatively soft outer surface free of voids or pockets.

Another important object of this invention is to provide a method of molding a composite load supporting structure wherein a frame is placed within a closed mold and a preformed pad is placed between the top surface of the closed mold and the frame so as to absorb the gases formed during the reaction of the foam mixture introduced into the mold and permitting the foam to contact the pad and adhere thereto.

A still further object of this invention is to provide a method of molding a foam cushion unit having offset mounting means attached to the internal frame molded in place by using a preformed pad between the frame and the offset mounting means to preclude the foam from rising into engagement with the offset mounting means.

Another object of the invention is to provide a novel foamed in place wire within the load supporting unit for receiving securing means for covering material.

Still further objects of this invention will become apparent upon a reading of the following detailed description of this invention and annexed drawings in which:

FIGURE 1 is a perspective view of one load supporting embodiment of this invention in the form of a seat showing the base portion of the seat in section with parts broken away to illustrate the internal construction of the seat.

FIGURE 2 is a perspective view of a second load supporting embodiment of this invention in the form of a seat showing the base portion of the seat in section with parts broken away to illustrate the internal construction of the seat.

FIGURE 3 is a sectional view of a mold utilized in the method of making the structure of FIGURE 2.

Figure 4:
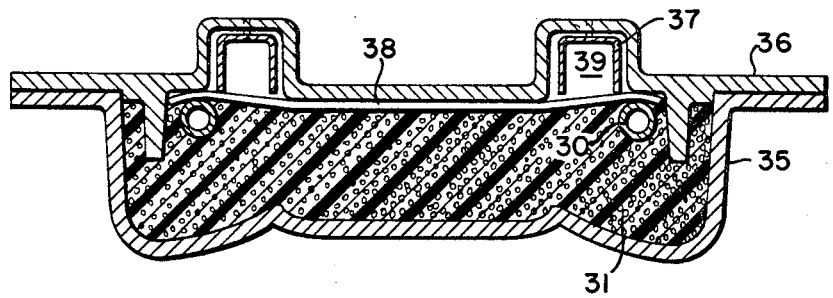
FIGURE 4 is a sectional view of a modified method of making the load supporting structure of FIGURE 2 using a preformed pad as a closure in the mold.

Before explaining the present invention in detail, it is to be understood that the invention is not limited in its application to the particular construction and arrangement of parts illustrated in the accompanying drawings since the invention is capable of other embodiments and of being practiced and carried out in other various ways. Also, it is to be understood that the phraseology and terminology employed herein is for the purpose of description and not of limitation.

Referring to the drawings, FIGURE 1 discloses an illustration of one load supporting embodiment of this invention for a new and novel load supporting construction and particularly, illustrates a bucket-type seat for use in vehicles. It will be obvious that the invention is applicable to other vehicular seat constructions and household furniture such as davenports, couches, chairs and the like. The seat construction shown in FIGURE 1 and generally indicated by the letter A comprises a base portion 1 and a back portion 2 for supporting the buttocks and back of the passenger respectively. FIGURE 1 illustrates the relationship of the frame or support member 3 which comprises the internal reinforcement surrounded by resilient material 4 which is bonded thereto. A suitable covering or upholstering material 5 is secured tightly around the resilient material for a finished load supporting structure. The frame can be made from flat steel, angle iron or tubular material and is rectangular in shape. The resilient material 4 is a foam rubber, preferably polyurethane foam, or other similar elastomeric or rubber-like foamed material which can be bonded or secured to the frame or support member 3.

While the structure illustrated in FIGURE 1 is a simple and flexible design, it has been found through extensive testing by thousands of cycles of load application and release to cushion constructions of this type that the cooperating resilient material and frame or support member provides a cushion construction with the durability required for many applications and yet is of minimum cost. The structure illustrated in FIGURE 1 has endured 100,000 cycles of load application and release in a fatigue or life test. Furthermore, the structure of FIGURE 1 has excellent characteristics of comfort and a pleasant "feel" to the person sitting on the structure. Thus, the unexpected performance of the simple load supporting structure of FIGURE 1 makes it a highly desirable structure for use in mass production of load supporting units because of its durability, long life, comfort, and flexibility of design. The basic combination of FIGURE 1, namely, the foamed resilient material in surrounding relationship to a support or frame member, is readily adaptable to many sizes and shapes of load supporting structures.

FIGURE 2 discloses an illustration of another load supporting environment of this invention for a new and novel seat construction which is identical with that of FIGURE 1 except for the preformed pad or insert 10 which is molded into one face of the foamed cushion unit. In the seat construction shown in FIGURE 2, the insert 10 is preferably cut from a selected polyurethane slab stock and subsequently molded to the resilient foamed material to form a unitary and completed seat construction. The hardness of the composite seat may be varied by a variation of the thickness of the insert 10 relative to the thickness of the resilient material 4' or in varying the relative densities or the physical characteristics of the preformed pad and resilient material 4'. The preformed insert 10 may range in thickness from ¼" to 1" but it has been found that ¼" thickness is preferable. While molding the insert 10 to the resilient material 4', the wet foam forming the resilient material 4' impregnates the insert 10 and creates a layer at the interface 15 between the insert 10 and resilient material 4' which is denser and tougher than either of said pad or resilient material. Also, the use of the preformed insert 10 ensures a smooth soft surface of the seat because without the insert 10 the air within the mold and gases formed during the foaming of the polyurethane are trapped and cause voids or pockets to be formed in the outer surface of the seat. The preformed pad may be of any suitable material which has the desired characteristics of flexibility and the requisite poorsity to permit the wet foam forming the resilient material 4' to impregnate the insert. It has been found that polyether urethane and polyester foams are suitable for the preformed insert 10, but other equivalent materials may be used, such as burlap, or other woven or nonwoven fabrics or materials made of organic or inorganic fibers or filaments. It has been found through extensive testing by thousands of cycles of load application and release to cushion constructions having a preformed insert molded into one face of the cushion that the insert materially improves the durability and load supporting characteristics of the cushion over a cushion or seat construction of resilient materail and frame as illustrated in FIGURE 1.

While the use of only one insert has been illustrated and described, it is to be understood that this invention encompasses the use of inserts in more than one face of the cushion unit and inserts within the foamed resilient material itself as alternating layers with the foamed resilient material.

Referring to FIGURE 3, a mold generally indicated as B utilized in making the composite load supporting structure of FIGURE 2 is illustrated. The female portion 20 and the cover or lid 21 of the mold B are shown in cross-section. The frame or support means 3' is supported during the molding operation in spaced relationship from the mold cover 21 by any suitable means 25 such as screws, bolts, magnetized pins or the like. The preformed insert 10 is shown in FIGURE 3 against the mold lid 21 and supported by the foamed resilient material 4'. With the frame 3' supported in place, the preformed insert 10 is placed on the frame and the polyurethane foam mixture is poured in a liquid state into the mold in a conventional manner on the bottom surface of the mold. The mold is then closed by placing the lid 21 on the mold female portion 20 and securing it in place and allowing the polyurethane foam mixture to react and rise thereby filling the mold with foam. When the mixture reacts and rises, the resulting foam carries the preformed insert 10 from its unsecured position upon the frame 3' to the upper portion of the mold against the mold cover 21 as shown in FIGURE 3. An alternative way of effecting placement of the preformed insert 10 in the upper surface of the seat unit as foamed within the mold would be to secure the preformed pad by pin means or other suitable means in place against the mold cover 21 before introduction of the polyurethane foam mixture into the mold. It is to be understood that this invention may be practiced not only with polyurethane foam such as polyether using the one-shot method, but also may be used in conjunction with the polyether urethane prepolymer. After the polyurethane foam mixture has foamed within the mold, the foam mixture is cured and treated by a heating process in the usual manner. Foam articles produced in this manner with the preformed pad were found to be practically free from defects while foams made without the preformed pad possessed considerable irregularities and defects upon removal of the mold lid 21. The resulting interface between the preformed insert 10 and the resilient material comprising the major portion of the seat unit is of denser, tougher consistency than either of the resilient materials of the preformed pad and the seat resilient material 4'. his denser, tougher interface provides a reinforced seat structure with a relatively soft outer surface. Test results hav shown that the seat structure made with a preformed pad and its resulting denser, tougher interface provides an unexpected degree of strength and durability to the composite load supporting structure of FIGURE 2 which makes this structure even more adaptable to various seating requirements and load supporting needs than the simpler structure of FIGURE 1.

FIGURE 4 illustrates another embodiment of the composite load supporting structure of this invention utilizing the preformed pad and mounting means for the structure molded in place. In the FIGURE 4 embodiment, tubular stock 30 is used as the frame or support means for the surrounding resilient material 31. It is to be understood that the resilient material 31 can be polyurethane foam such as polyether or a polyether prepolymer as was the case for the foamed resilient material 4' of FIGURES 2 and 3. The female portion of the mold of FIGURE 4 has the cross-sectional shape of the desired load supporting unit and the lid 36 has a shape which provides for accommodation of the mounting feet means 37 which are integral with the frame 30. The integral frame mounting feet 37 are desirable for providing means integral with the finished load supporting unit which can be readily mounted in adjusting tracks or guide rails in an automobile on which seats are customarily mounted to provide for adjustment of the seat relative to the steering wheel to accommodate drivers of differing size as is well known. The embodiment of FIGURE 4 is formed and molded in the same manner as described above regarding the FIGURE 3 embodiment with the exception that the preformed pad or insert 38 of the FIGURE 4 embodiment is not floated by the resulting foam to the top of the mold but rather is mounted in place against the mold lid between said lid and the frame rail 30. The preformed insert 38 plays an essential part during the molding of the FIGURE 4 embodiment as a closure in that it isolates the mounting feet 37 and the frame 30 in opposite cavities of the mold and precludes the resulting foam from rising into the hollow portions 39 of the frame mounting feet 37. The preformed insert 38 may be of varying thickness and physical characteristics, but it has been found that a ¼" thickness is preferable. The use of the preformed insert 38 ensures a smooth, soft surface of the seat because without the pad 38 the air within the mold and gases formed during the foaming of the polyurethane are trapped and cause voids or pockets to be formed in the outer surface of the seat. Thus, the use of the preformed slab ensures a load supporting structure having an acceptable surface free of voids or splits or air pockets and a stronger foam section, and confines the foam to the desired shape.

While the illustrated embodiments of FIGURES 2–4 of this invention have illustrated the preformed pad as molded in the bottom surface of the load supporting unit, it is to be understood that the preformed pad could be molded into any surface of the load supporting unit including the top surface and even in both the top and bottom surfaces simultaneously if it were so desirable and advantageous. Furthermore, the invention is not confined to any particular shape or configuration of the preformed pad which could be made to any size, shape or configuration, to suit any particular needs.

Figure 5:
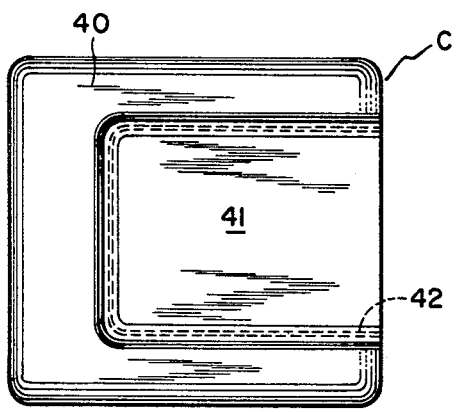
FIGURE 5 is a plan view of a modified form of a load supporting structure of this invention.
Figure 6:
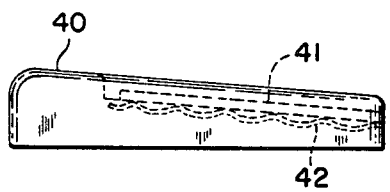
FIGURE 6 is a side elevational view of FIGURE 5.

FIGURES 5 and 6 illustrate an adaptation of the present invention to a particular style of seat namely, a bucket vehicle seat. The bucket seat generally indicated as C has a bolstered area 40 which is generally uplifted or offset from a lower central seating area 41. A wire 42 is molded in place in the seat unit C at the junction of the bolster area 40 and the central seating area 41. The bolster wire is molded in place near the surface of the seating area 41. In covering the seat unit C with a covering material or upholstery, it is a simple matter to "hog-ring" or otherwise attach the covering material to the molded in place wire within the seat unit. This arrangement for attaching the covering material to the molded seat unit is extremely expedient for production needs and cost saving over the conventional method of hand-threading a wire or other means attached to the underside of the seat unit through integral loops attached to the underside of the covering material. The use of the molded in place cover tie-down wire 42 is adaptable to any molded foam seat design. For example, in another model seat design having a generally level surface contour, parallel tie-down wires are extended longitudinally near the lateral edges of the foamed seat for receiving attaching means for securing the covering material. The molded in place cover tie-down wire can be of any desired shape or configuration, but in the embodiment illustrated in FIGURES 5 and 6, it is an undulated wire of an open rectangular shape. The lower portions of the undulated wire serve as anchoring means for the upper portions of the wire to which the cover tie-down material is attached.

While the invention has been described for particular use within the base portion of a seat, it is to be understood that the invention could be utilized in the back portion of a seat as in the back portion 2 as illustrated in FIGURE 1, or in a bench type seat often utilized in the rear seat of an automobile.

It should be understood that the preferred embodiment of the present invention has been described herein in great detail and that certain modifications and changes may be made by those skilled in the art to which it relates and it is intended to cover hereby all changes, adaptations and modifications falling within the scope of the appended claims.

Having described our invention, we claim:

1. A composite load supporting structure compirsing:
   frame means adjacent the sides of said structure and outwardly of the central load supporting surface of the structure,
   foamed elastomeric material surrounding and bonded to said frame means and forming the desired shape of said load supporting structure,
   a preformed layer of porous material bonded to said foamed elastomeric material, said preformed layer being impregnated with said elastomeric material to form an interface therebetween of denser, tougher consistency than either said preformed layer or said elastomeric material to provide a reinforced load supporting structure with surfaces free of voids or pockets,
   a wire molded in place within said elastomeric material adjacent a surface thereof, and
   upholstery material covering said foamed elastomeric material and said preformed layer and means securing said upholstery material directly to said wire.

2. A composite load supporting structure comprising:
   frame means,
   foamed elastomeric material of a desired shape bonded to said frame means forming a load supporting surface of said structure, and a preformed insert having sufficient porosity to be impregnated by said elastomeric material when in a wet state, said preformed insert molded into the surface of said structure opposite to said load supporting surface,
   the interface between said insert and said elastomeric material being of denser, tougher consistency than either of said insert or said elastomeric material to provide a reinforced seat structure with a relatively soft outer surface free of voids or pockets.

3. A composite load supporting structure comprising:
   frame means disposed adjacent the sides of said structure and outwardly of the central load supporting surface of the structure,
   foamed elastomeric material surrounding and bonded to said frame means and forming the desired shape of said load supporting structure,
   a preformed layer having sufficient porosity to be impregnated by said elastomeric material when in a wet state, said preformed layer molded into at least a surface of said elastomeric material and,
   impregnated with said elastomeric material to form an interface therebetween of denser, tougher consistency than either said preformed layer or said elastomeric material to provide a reinforced load supporting structure with surfaces free of voids or pockets.

4. A composite load supporting structure comprising:
   foamed elastomeric material of a desired shape having a load supporting surface,
   frame means supporting said foamed material,
   upholstery material covering said foamed elastomeric material, wire means bonded to and embedded within said foamed elastomeric material between said frame and said load supporting surface, and
   tie-down means extending through said load supporting surface for securing said upholstery material directly to said wire means.

5. The composite load supporting structure as set forth in claim 4 wherein:
   the tie-down means comprises an open-ended circular ring which is attached to the underside of the upholstery material and closed about said embedded wire means.

6. The load supporting structure as set forth in claim 3 wherein:
   said preformed layer of porous material is molded into different portions of said elastomeric material.

7. The load supporting structure as set forth in claim 3 wherein:
   said preformed layer is molded into at least one surface of said elastomeric material.

8. The load supporting structure as set forth in claim 3 wherein:
   said preformed layer is a foamed elastomeric material of different physical properties than the elastomeric material bonded to said frame.

9. The load supporting structure as set forth in claim 3 wherein:
   said preformed layer is of a size smaller and thinner than said elastomeric material.

10. The load supporting structure as set forth in claim 3 wherein:
    said preformed layer ranges in thickness from ¼" to 1".

11. The load supporting structure as set forth in claim 3 wherein:
    the elastomeric material of said preformed layer is of less density than the elastomeric material bonded to said frame.

12. A composite load supporting structure comprising:
    frame means,
    foamed elastomeric material of a desired shape bonded to said frame means forming a load supporting top surface of said structure, and a preformed insert having uniform porosity throughout its surface, the porosity of said insert being sufficient to be impregnated by said elastomeric material when in a wet state, said preformed insert molded into the surface of said structure opposite to said load supporting surface.

13. The composite load supporting structure as set forth in claim 2 wherein:

said frame means has external mounting means connected thereto in spaced relationship in a direction away from the load applying top surface of said structure.

14. The composite load supporting structure as set forth in claim 2 wherein:

the insert is of a size smaller and thinner than said elastomeric material comprising said structure.

15. The composite load supporting structure as set forth in claim 4 wherein:

said wire means is located adjacent said load supporting surface of said foamed elastomeric material and has an undulated configuration having lower portions serving to retain said wire in place in said foamed elastomeric material and upper portions for receiving said upholstery material securing means.

16. The composite load supporting structure as set forth in claim 4 wherein:

a surface of said foamed elastomeric material has a preformed flexible insert molded therein.

References Cited

UNITED STATES PATENTS

| | | | |
|---|---|---|---|
| 2,845,997 | 8/1958 | Waite | 297—457 |
| 3,081,077 | 3/1963 | Sudman | 267—111 |
| 3,035,828 | 5/1962 | Stubnitz | 267—110 |
| 3,084,980 | 4/1963 | Lawson | 297—452 X |
| 3,112,987 | 12/1963 | Griffiths | 264—45 |
| 3,124,627 | 3/1964 | Hood | 264—45 |
| 3,140,086 | 7/1964 | Lawson | 267—111 |
| 3,161,436 | 12/1964 | Grimshaw | 207—460 |
| 3,208,085 | 9/1965 | Buist et al. | 5—345 |
| 3,210,782 | 10/1965 | Regan | 5—361 |
| 3,220,769 | 11/1965 | Smith | 297—384 |
| 3,252,735 | 5/1966 | Smith | 297—452 |
| 3,258,511 | 6/1966 | McGregor | 297—452 X |
| 3,259,435 | 7/1966 | Jordan | 297—455 |
| 3,264,034 | 8/1966 | Lawson | 297—458 |
| 3,266,844 | 8/1966 | Amstutz | 297—452 |

CASMIR A. NUNBERG, *Primary Examiner.*